United States Patent
Sato et al.

(10) Patent No.: US 9,046,176 B2
(45) Date of Patent: Jun. 2, 2015

(54) HYDRAULIC AUTO-TENSIONER

(71) Applicants: Seiji Sato, Shizuoka (JP); Hisashi Hayakawa, Shizuoka (JP); Tasuku Furukawa, Shizuoka (JP); Tadahisa Tanaka, Shizuoka (JP)

(72) Inventors: Seiji Sato, Shizuoka (JP); Hisashi Hayakawa, Shizuoka (JP); Tasuku Furukawa, Shizuoka (JP); Tadahisa Tanaka, Shizuoka (JP)

(73) Assignee: NTN Corporation, Osaka (JP)

( * ) Notice: Subject to any disclaimer, the term of this patent is extended or adjusted under 35 U.S.C. 154(b) by 163 days.

(21) Appl. No.: 13/860,583

(22) Filed: Apr. 11, 2013

(65) Prior Publication Data

US 2013/0269514 A1    Oct. 17, 2013

(30) Foreign Application Priority Data

Apr. 16, 2012  (JP) ................................. 2012-092997
Aug. 30, 2012  (JP) ................................. 2012-190041

(51) Int. Cl.
*F16H 7/22* (2006.01)
*F16H 7/08* (2006.01)
*F16J 1/00* (2006.01)
*F16F 9/54* (2006.01)

(52) U.S. Cl.
CPC ... *F16J 1/00* (2013.01); *F16F 9/54* (2013.01); *F16F 2230/14* (2013.01); *F16F 2230/28* (2013.01)

(58) Field of Classification Search
CPC ............... F16H 2007/0859; F16H 2007/0806; F16H 2007/0812; F16H 7/0848; F16H 2007/0891

USPC ........................................................ 474/110
See application file for complete search history.

(56) References Cited

U.S. PATENT DOCUMENTS

| | | | |
|---|---|---|---|
| 3,239,286 A * | 3/1966 | Harrison ........................ | 384/222 |
| 3,316,033 A * | 4/1967 | Bila .............................. | 384/222 |
| 3,799,481 A * | 3/1974 | Anderson ................ | 188/321.11 |
| 4,002,327 A * | 1/1977 | Damon ........................ | 267/281 |
| 4,762,310 A * | 8/1988 | Krajewski et al. ......... | 267/141.2 |
| 4,790,801 A * | 12/1988 | Schmidt et al. ............... | 474/110 |
| 4,976,660 A * | 12/1990 | Breindl ........................ | 474/135 |
| 5,026,330 A * | 6/1991 | Zermati et al. ................ | 474/138 |
| 5,219,231 A * | 6/1993 | Sheedy ........................ | 384/206 |
| 5,405,298 A * | 4/1995 | Bristot ........................ | 474/136 |
| 5,540,420 A * | 7/1996 | Luzsicza ..................... | 267/141.1 |
| 5,746,673 A * | 5/1998 | Polster et al. ................. | 474/101 |
| 5,820,115 A * | 10/1998 | Stevenson et al. ............ | 267/293 |

(Continued)

FOREIGN PATENT DOCUMENTS

JP  09-170447  6/1997

*Primary Examiner* — Henry Liu
(74) *Attorney, Agent, or Firm* — Wenderoth, Lind & Ponack, L.L.P.

(57) ABSTRACT

A hydraulic auto-tensioner includes a cylinder containing hydraulic oil, a rod inserted in the cylinder, and two coupling pieces mounted to the bottom of the cylinder and the top end of the rod, respectively. A support ring is inserted in the mounting hole of each coupling piece, and a bush is inserted in the support ring. One of the radially inner surface of the mounting hole and the radially outer surface of the support ring is a curved surface such that the support ring is alignable. Radially outwardly extending flanges are formed at one end of the support ring and at the other end of the bush such that the flanges axially face the respective end surfaces of the coupling piece with gaps left therebetween. A coupling arrangement is provided between the support ring and the bush which is adapted to engage both the support ring and the bush when the bush is inserted into the support ring, thereby axially inseparably coupling them together.

13 Claims, 9 Drawing Sheets

(56) References Cited

U.S. PATENT DOCUMENTS

| | | | |
|---|---|---|---|
| 5,967,923 A * | 10/1999 | Petri | 474/138 |
| 6,036,612 A * | 3/2000 | Katogi et al. | 474/110 |
| 6,170,812 B1 * | 1/2001 | Nicoles | 267/281 |
| 6,854,917 B2 * | 2/2005 | Kraine et al. | 403/120 |
| 8,172,709 B2 * | 5/2012 | Bodensteiner et al. | 474/140 |
| 2008/0020876 A1 * | 1/2008 | Tanaka | 474/110 |
| 2010/0099528 A1 * | 4/2010 | Hartmann et al. | 474/110 |
| 2011/0116731 A1 * | 5/2011 | McLaughlin | 384/153 |

* cited by examiner

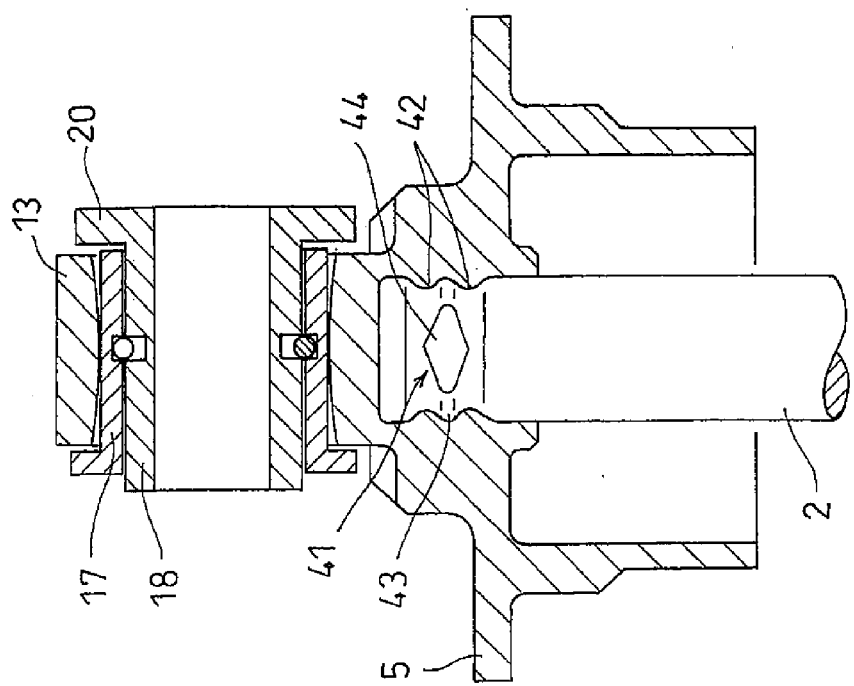
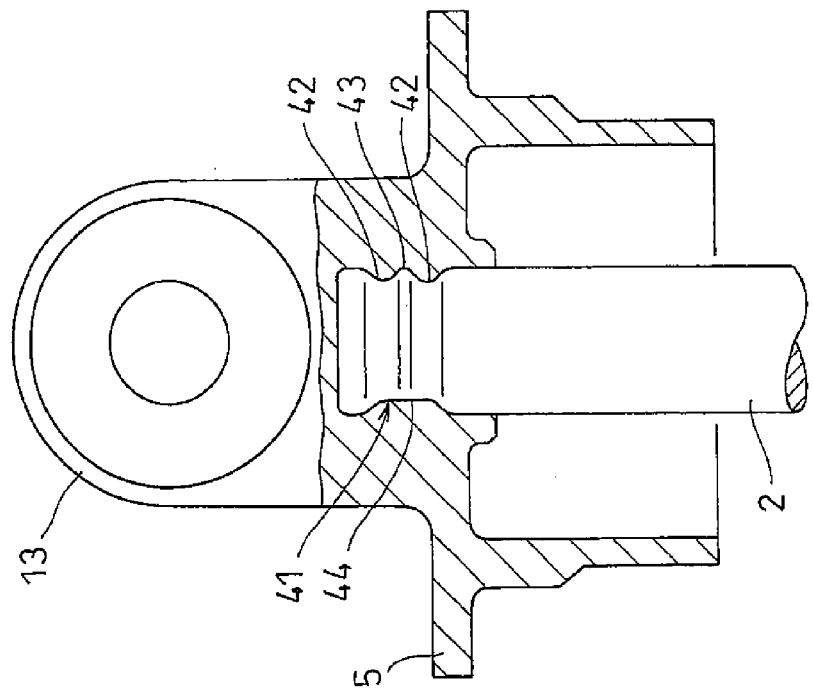

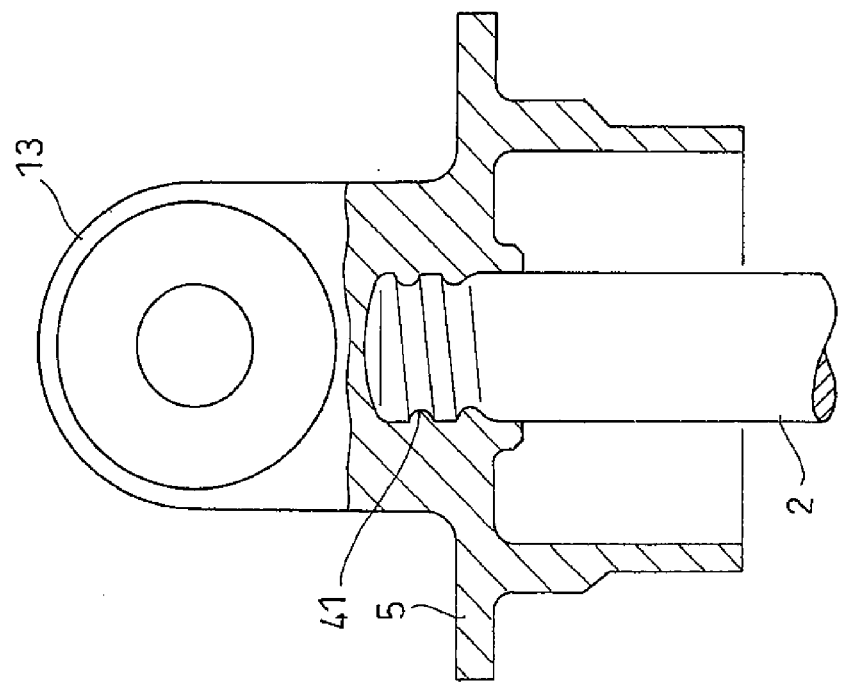
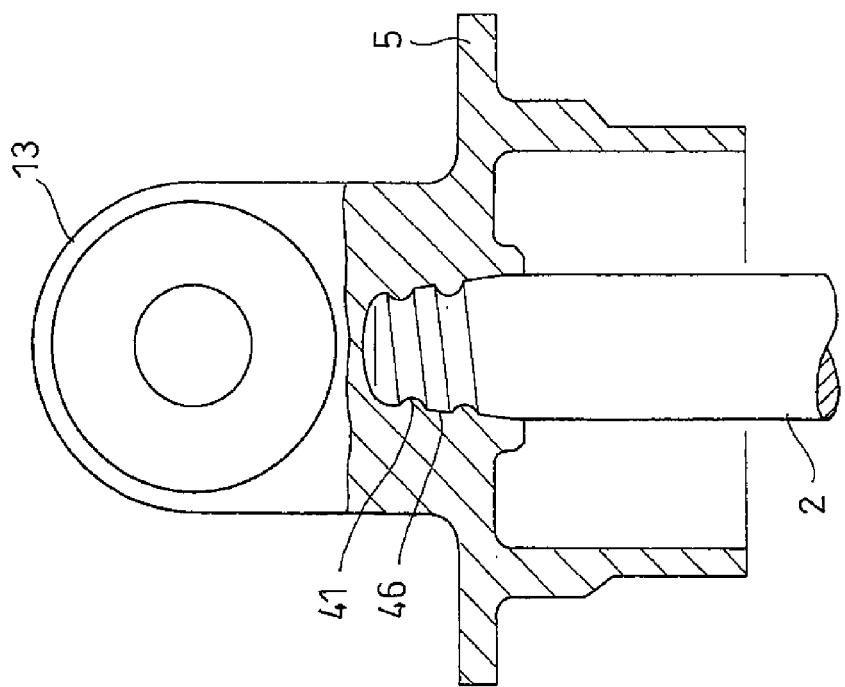

HYDRAULIC AUTO-TENSIONER

CROSS REFERENCE TO RELATED APPLICATIONS

This application is based on and claims priority under 35 U.S.C. sctn. 119 with respect to Japanese Patent Application No. 2012-092997 filed on Apr. 16, 2012 and No. 2012-190041 filed on Aug. 30, 2012, the entire content of which is incorporated herein by reference.

BACKGROUND OF THE INVENTION

This invention relates to a hydraulic auto-tensioner used to adjust the tension of an engine accessory driving belt.

FIG. 13 shows a belt transmission device for transmitting the rotation of a vehicle engine crankshaft to various engine accessories such as an alternator, a water pump and a compressor of an air-conditioner. This belt transmission device includes a pulley arm 83 provided on the slack side of a belt 81 so as to be pivotable about a pivot shaft 82, a tension pulley 84 supported on a pivot end of the pulley arm 83, and a hydraulic auto-tensioner A that applies an adjusting force to the pulley arm 83 in a direction in which the tension pulley 84 is pressed against the belt 81, thereby keeping constant the tension of the belt 81.

A conventional hydraulic auto-tensioner used as the auto-tensioner A typically includes a cylinder containing hydraulic oil therein, a rod having the lower end portion thereof inserted in the cylinder, a return spring elastically biasing the rod in a direction to protrude from the cylinder, and a hydraulic damper that dampens a pushing force tending to push in the rod.

This hydraulic auto-tensioner further includes a first coupling piece provided at the closed bottom end of the cylinder, and a second coupling piece mounted on a top end portion of the rod protruding from the top end of the cylinder. The first coupling piece is pivotally coupled to engine block, and the second coupling piece is coupled to the pulley arm 83 shown in FIG. 13.

With the auto-tensioner mounted in position as shown in FIG. 13, the first and second coupling pieces tends to displace in the axial direction of coupling shafts extending perpendicular to the axis of the hydraulic auto-tensioner, thus causing the hydraulic auto-tensioner A to be inclined.

If the auto-tensioner A is inclined, the cylinder and the rod cannot be moved smoothly relative to each other in the direction in which the rod protrudes from and retracts into the cylinder. This prevents the hydraulic auto-tensioner to fully perform its expected function. In order to avoid this problem, JP Patent Publication 9-170447A discloses a hydraulic auto-tensioner in which a bush and an elastic ring is mounted in a mounted hole formed in each of a first coupling piece mounted to the cylinder and a second coupling piece mounted to the rod with the elastic ring located around the bush. One of the radially outer surface of the elastic ring and the radially inner surface of the mounting hole is a curved surface such that the elastic ring and the bush supported by the elastic ring are kept in alignment irrespective of the inclination of the hydraulic auto-tensioner.

In the arrangement of JP Patent Publication 9-170447A, in order to prevent separation of the elastic ring and to keep the elastic ring and the bush kept in alignment, the elastic ring has a pair of radially outwardly extending flanges formed at the respective end portions of the radially outer surface of the elastic ring with axial plays left between the flanges and the respective end surfaces of the coupling piece. Since the flanges have an outer diameter larger than the inner diameter of the mounting hole of the coupling piece, the flanges become a major obstacle in mounting the elastic member in position.

The elastic ring has an annular rib on the radially inner surface thereof which is adapted to be engaged in an annular groove formed in the radially outer surface of the bush to inseparably couple the bush and the elastic ring together. But it is not easy to fit the annular rib in the annular groove when inserting the bush into the elastic member.

SUMMARY OF THE INVENTION

An object of the present invention is to provide a hydraulic auto-tensioner which can be inclined smoothly when mounted in a belt transmission device, and which can be assembled easily.

In order to achieve this object, the present invention provides a hydraulic auto-tensioner comprising a cylinder containing hydraulic oil, a rod inserted in the cylinder, a return spring biasing the rod and the cylinder in a direction in which the rod protrudes from the cylinder, a hydraulic damper mechanism mounted in the cylinder and configured to dampen a pushing force that tends to axially push the rod into the cylinder against the force of the return spring, and first and second coupling piece assemblies, wherein the first coupling piece assembly includes a coupling piece mounted to a closed bottom end of the cylinder and the second coupling piece assembly includes a coupling piece mounted on a top end portion of the rod which protrudes from the cylinder, each of the coupling pieces being formed with a mounting hole and having first and second axial end surfaces, wherein each of the first and second coupling piece assemblies further comprises a support ring inserted in the mounting hole, and a bush inserted in the support ring, wherein one and the other of a radially outer surface of the support ring and a radially inner surface of the mounting hole are a curved surface and cylindrical surface, respectively, whereby the support ring is alignable, wherein the support ring has a first radially outwardly extending flange at a first end portion of the support ring and the bush has a second radially outwardly extending flange at a second end portion of the bush which is axially opposite to the first end of the support ring such that first and second axial gaps are defined between the first radially outwardly extending flange and the first axial end surface of the coupling piece and between the second radially extending flange and the second axial end surface of the coupling piece, respectively, and wherein each of the first and second coupling piece assemblies further includes a coupling arrangement configured to engage both the support ring and the bush when the bush is inserted into the support ring, thereby preventing axial separation of the support ring and the bush from each other.

In this arrangement, when mounting the support ring and the bush in each coupling piece, the support ring is inserted into the mounting hole from one end of the mounting hole, and then bush is inserted into the support ring from the other end of the mounting hole. When the bush is inserted into the support ring, the coupling arrangement engages both the support ring and the bush, coupling the support ring and the bush together.

In this assembled state, the outer peripheral portions of the flanges formed on the support ring and the bush axially face the respective end surfaces of the coupling piece, preventing separation of the support ring and the bush from the coupling piece, with the support ring and the bush alignable in the coupling piece.

FIG. 13 shows how this hydraulic auto-tensioner is used in the tension adjusting device for the engine accessory driving belt. In particular, bolts are inserted into the bushes mounted in the mounting holes of the coupling piece mounted to the cylinder (hereinafter referred to as the "first coupling piece) and the coupling piece mounted to the rod ("second coupling piece"), respectively, and the first and second coupling pieces are coupled to the engine block and the pulley arm, respectively, by tightening the respective bolts.

With the auto-tensioner mounted in position in this manner, if the first and second coupling pieces are displaced in the axial direction of the coupling shafts (bolts), which extend perpendicular to the axis of the hydraulic auto-tensioner, such that the auto-tensioner A is inclined, the first and second coupling pieces are allowed to pivot relative to the respective support rings and bushes, corresponding to the inclination of the auto-tensioner A. The rod can thus smoothly protrude from and retract into the cylinder even if the auto-tensioner is inclined.

Preferably, the bush is formed of aluminum and the support ring is formed of a synthetic resin so that the bush and the support ring can be formed easily and thus at a low cost. Also, a support ring made of a synthetic resin is more durable than a support ring made of an elastic material.

The synthetic resin forming the support ring may be polyamide 66 (PA66) or polyimide 46 (PA46), preferably reinforced with glass fibers or carbon fibers for improved durability.

The coupling arrangement for axially inseparably coupling the support ring and the bush together may include a pair of ring grooves formed in the radially inner surface of the support ring and the radially outer surface of the bush, respectively, so as to be radially aligned with each other, and a coupling ring which is radially deformable so as to engage both of the pair of ring grooves. Alternatively, the coupling arrangement may include an annular engaging groove formed in first end portion of the radially outer surface of the bush, and a protrusion formed on the first end portion of the radially inner end surface of the support ring and engaged in the annular engaging surface, and wherein the bush has a tapered guide surface at the intersection between the first end surface and the radially outer surface.

The above-mentioned coupling ring may be a snap ring having circumferentially opposed separate ends, or an O-ring made of rubber. If a snap ring is used, one of the pair of ring grooves has a depth equal to or larger than the diameter of the wire forming the snap ring such that the snap ring can be entirely received in the one of the ring grooves when elastically deformed.

With this arrangement, simply by inserting the support ring into the mounting hole of each coupling piece from one end of the mounting hole, and then inserting the bush into the support ring from the other end of the mounting hole, the coupling arrangement engages both the support ring and the bush, thereby coupling the support ring and the bush together. Thus, the support ring and the bush can be extremely easily mounted in the coupling piece. The entire hydraulic auto-tensioner can thus be easily assembled too.

BRIEF DESCRIPTION OF THE DRAWINGS

FIG. 7A is a sectional view showing an engaging arrangement for coupling the rod and a spring washer together;

FIG. 7B is a vertical sectional view of FIG. 7A;

FIG. 10 is a sectional view showing a yet different engaging arrangement for coupling the rod and the sprig washer together;

FIG. 11 is a sectional view showing a further different engaging arrangement for coupling the rod and the sprig washer together;

DETAILED DESCRIPTION OF THE PREFERRED EMBODIMENTS

Figure 1:
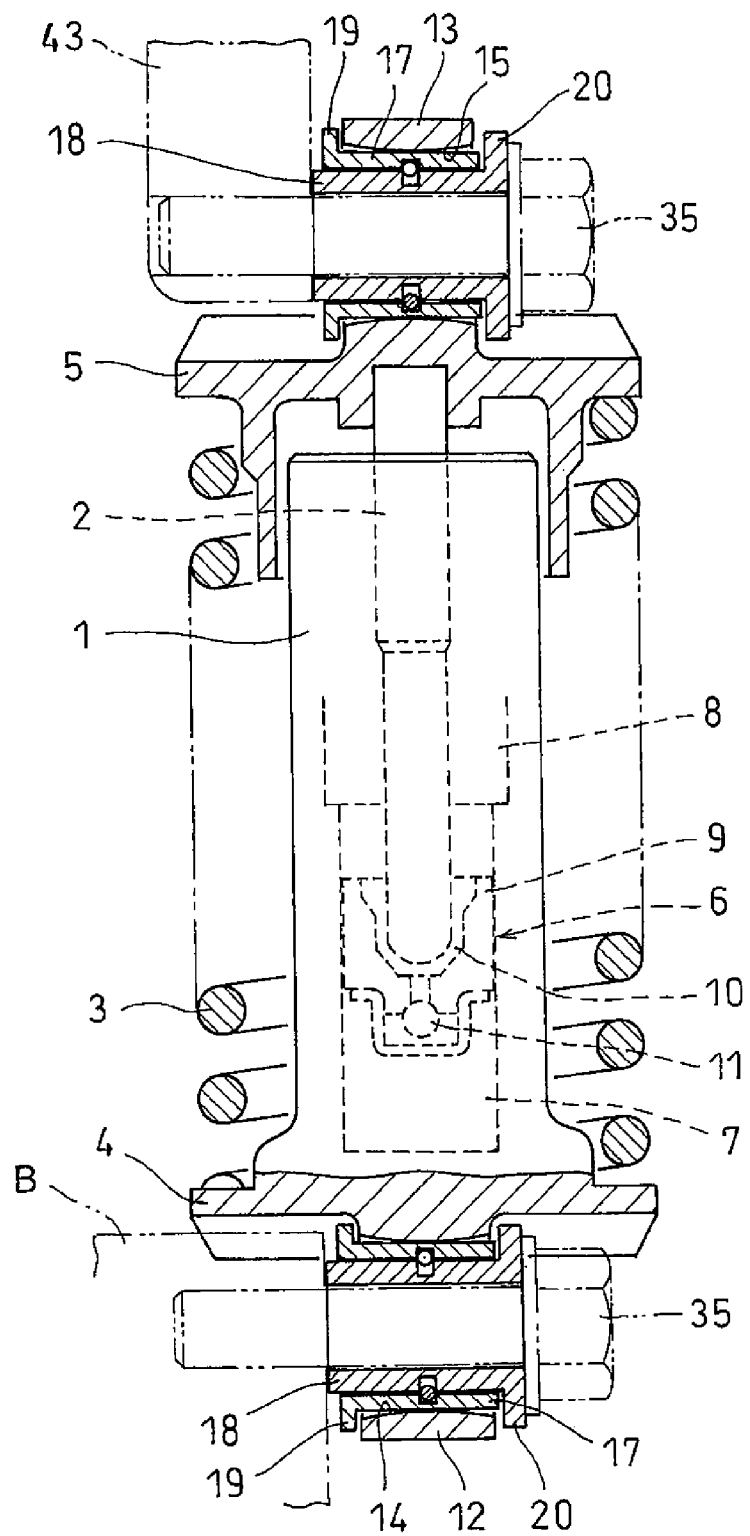
FIG. 1 is a partially cut-away front view of a hydraulic auto-tensioner according to the present invention.

Now the hydraulic auto-tensioner embodying the present invention is described with reference to the drawings. As shown in FIG. 1, this hydraulic auto-tension includes a cylinder 1, a rod 2 having its bottom end portion inserted in the cylinder 1, and a return spring 3.

The cylinder 1 has a closed bottom end and contains hydraulic oil. The return spring 3 is mounted around the cylinder 1 and has its respective ends supported by a flange 4 formed on the outer periphery of the cylinder 1 at its lower portion, and a spring washer 5 provided at the upper portion of the rod 2, thereby biasing the cylinder 1 and the rod 2 in the direction in which the rod 2 protrudes from the cylinder 1.

But the return spring 3 may be mounted in the cylinder 1 instead.

The auto-tensioner further includes a hydraulic damper mechanism 6 mounted in the cylinder 1 to dampen any pushing force applied to the rod 2 that tends to push the rod into the cylinder. The hydraulic damper mechanism 6 shown includes a plunger 9 slidably mounted in the cylinder 1, partitioning the interior of the cylinder 1 into a pressure chamber 7 and a reservoir chamber 8, the plunger 9 having a passage 10 through which the pressure chamber 7 communicates with the reservoir chamber 8, and a check valve 11 provided at the opening of the passage 10 facing the pressure chamber 7, whereby when the pressure in the pressure chamber 7 exceeds the pressure in the reservoir chamber 8 due to the pushing force applied to the rod 2, the check valve 11 closes the passage 10, thereby dampening the pushing force applied to the rod 2 with the hydraulic oil in the pressure chamber 7.

But the damper mechanism 6 of the present invention is not limited to the one shown and described above.

The auto-tensioner further includes a first coupling piece 12 provide on the bottom surface of the cylinder 1, and a second coupling piece 13 provided on the spring washer 5 provided at the upper portion of the rod 2.

The first and second coupling pieces 12 and 13 are formed with mounting holes 14 and 15 extending through the respective coupling pieces from one to the other side thereof. The mounting holes 14 and 15 are identical in shape to each other, and elements mounted in the mounting hole 14 are identical to those mounted in the mounting hole 15. Thus only the elements mounted in the second coupling piece 13, i.e. the coupling piece mounted on the rod are described here, and the elements mounted in the first coupling piece 12 are denoted by the same numerals as the corresponding elements mounted in the second coupling piece 13.

Figure 2:
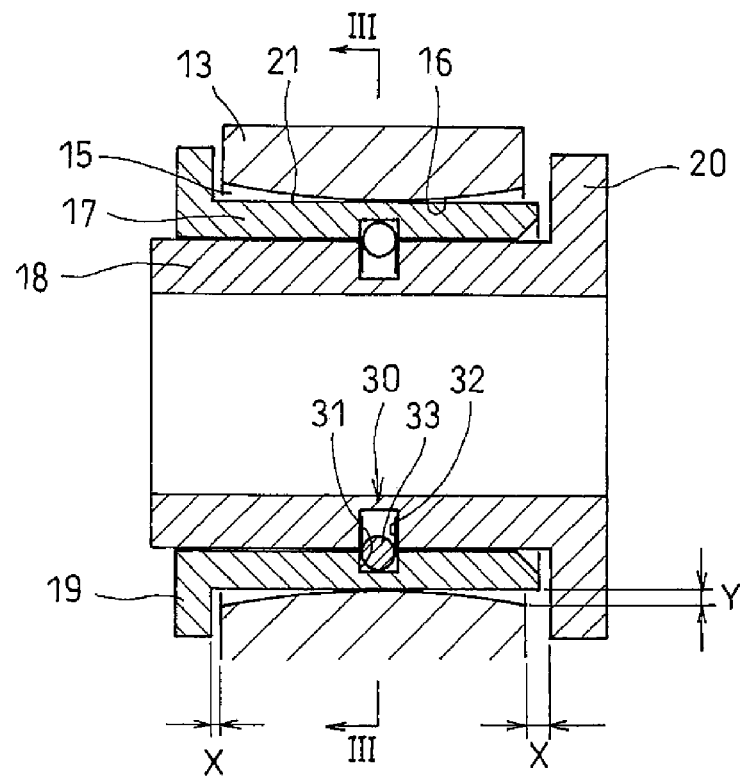
FIG. 2 is an enlarged sectional view of a coupling piece mounted to a rod of FIG. 1.
Figure 3:
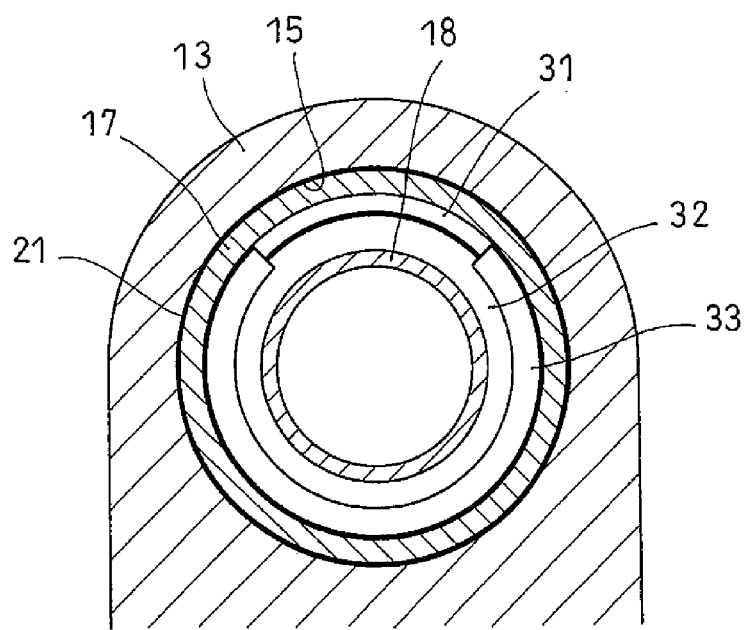
FIG. 3 is a sectional view taken along line III-III of FIG. 2.

As shown in FIGS. 2 and 3, the mounting hole 15 of the coupling piece 13 has a radially inner curved surface 16 having a convex circular arc-shaped section.

A support ring 17 and a bush 18 are mounted in the mounting hole 15 with the bush 18 fitted in the support ring 17. The support ring 17 has an axial length larger than the width of the coupling piece 13, i.e. the distance between the ends of the coupling piece 13, and is formed with a flange 19 radially outwardly extending from the outer periphery of the support ring 17 at one end of the support ring 17 protruding from the mounting hole 15.

The bush 18 has an axial length larger than the axial length of the support ring 17, and is formed with a flange 20 radially outwardly extending from the outer periphery of the bush 18 at the end of the bush 18 protruding from the other end of the support ring 17.

The flanges 19 and 20 have outer diameters larger than the inner diameters of the mounting hole 15 at the respective ends thereof such that their radially outer portions axially face the respective end surfaces of the coupling piece 13 with axial gaps X therebetween.

The support ring 17 has a cylindrical radially outer surface 21 which is in contact with the radially inner surface of the mounting hole 15, or axially faces it with a minute gap therebetween, at the axial central portion of the support ring 17, such that a radial gap Y between the support ring 17 and the mounting hole 15 gradually increases from the central portion of the support ring 17 toward the respective ends of the mounting hole 15. The support ring 17 can be aligned within the range determined by the radial gap Y and the axial gaps X.

The support ring 17 is formed of a synthetic resin. The bush 18 is formed of aluminum. A coupling arrangement 30 is provided between the support ring 17 and the bush 18 which brings the bush 18 into engagement with the support ring 17, thereby preventing axial separation of the support ring 17 and the bush 18 from each other, when the bush 18 is inserted into the support ring 17.

The coupling arrangement 30 includes an ring groove 31 formed in the radially inner surface of the support ring 17, a ring groove 32 formed in the radially outer surface of the bush 18 and adapted to be radially aligned with the ring groove 31 when the bush 18 is inserted into the support ring 17, and a radially elastically deformable coupling ring 33 which is engageable in the ring grooves 31 and 32 simultaneously.

In the embodiment shown, the coupling ring 33 is a snap ring having separate circumferential ends, but may be an O-ring made of rubber instead. If a snap ring having separate circumferential ends is used as the coupling ring 33, the ring groove 32 formed in the radially outer surface of the bush has a depth equal to or larger than the diameter of the wire forming the coupling ring 33 such that the coupling ring 33 can be entirely received in the ring groove 32 by radially compressing the coupling ring 33, while the ring groove 31 formed in the inner periphery of the support ring 17 has a depth of about half the diameter of wire forming the coupling ring 33.

Conversely, the ring groove 31 formed in the inner periphery of the support ring 17 may have a depth equal to or larger than the diameter of the wire forming the coupling ring 33 such that the coupling ring 33 can be entirely received in the ring groove 31 by radially expanding the coupling ring 33, while the ring groove 32 formed in the radially outer surface of the bush 18 has a depth of about half the diameter of the wire forming the coupling ring 33.

Now description is made of how the support ring 17 and the bush 18 are mounted in position. First, the support ring 17 is inserted into each of the mounting holes 14 and 15 of the respective coupling pieces 12 and 13 from one end of the mounting hole. The bush 18 is then inserted into the support ring 17 from the other end of the mounting hole. The support ring 17 and the bush 18 are further moved relative to each other such that the bush 18 is pushed into the support ring 17.

Figure 4A:
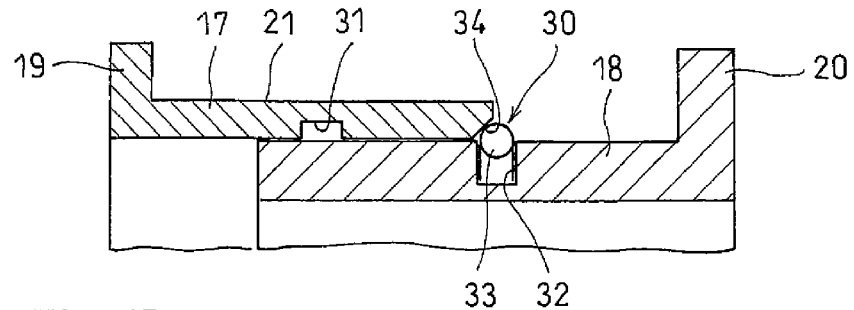
FIG. 4A is a sectional view of a support ring and a bush, showing a state before the support ring and the bush are coupled together.
Figure 4B:
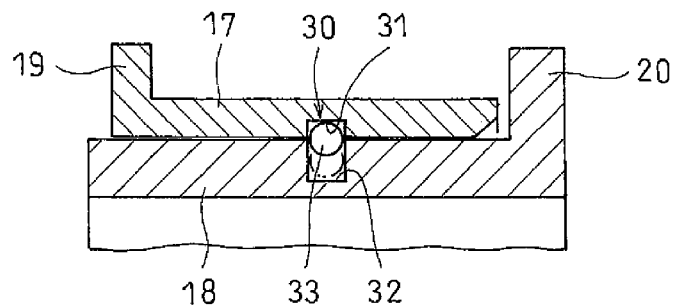
FIG. 4B is a similar sectional view, showing how the support ring and the bush are coupled together.

FIGS. 4A and 4B show in a stepwise manner how the support ring 17 and the bush 18 are coupled together. In the state of FIG. 4A, the coupling ring 33 is fitted in the ring groove 32 formed in the radially outer surface of the bush 18.

From the state of FIG. 4A, when the support ring 17 and the bush 18 are moved relative to each other such that the bush 18 is pushed into the support ring 17, the distal end surface of the support ring 17 abuts and presses the coupling ring 33 so as to radially compress the coupling ring 33 until the coupling ring 33 is entirely pushed into the ring groove 32.

When the bush 18 is further pushed into the support ring 17, and the ring groove 31 of the support ring 17 is radially aligned with the ring groove 32 of the bush 18 as shown in FIG. 4B, the coupling rig 33 is radially expanded by its own elasticity until the ring 33 is partially fitted in the ring groove 31 and partially fitted in the ring groove 32. Thus, in this state, the support ring 17 and the bush 18 are coupled together in an assembled state by the coupling ring 33.

In this state, since the flange 19 of the support ring 17 and the flange 20 of the bush 18 axially face, at the radially outer portions of the respective flanges 19 and 20, the respective end surfaces of each of the coupling piece 12 and 13, the support ring 17 and the bush 18 are prevented from separating from each other, and can be aligned in each of the mounting holes 14 and 15 of the respective coupling pieces 12 and 13.

As shown in FIG. 4A, a tapered surface 34 is preferably formed on the radially inner surface of the support ring 17 at the distal end of the support ring 17 to that the coupling ring 33 can be smoothly radially compressed.

Figure 13:
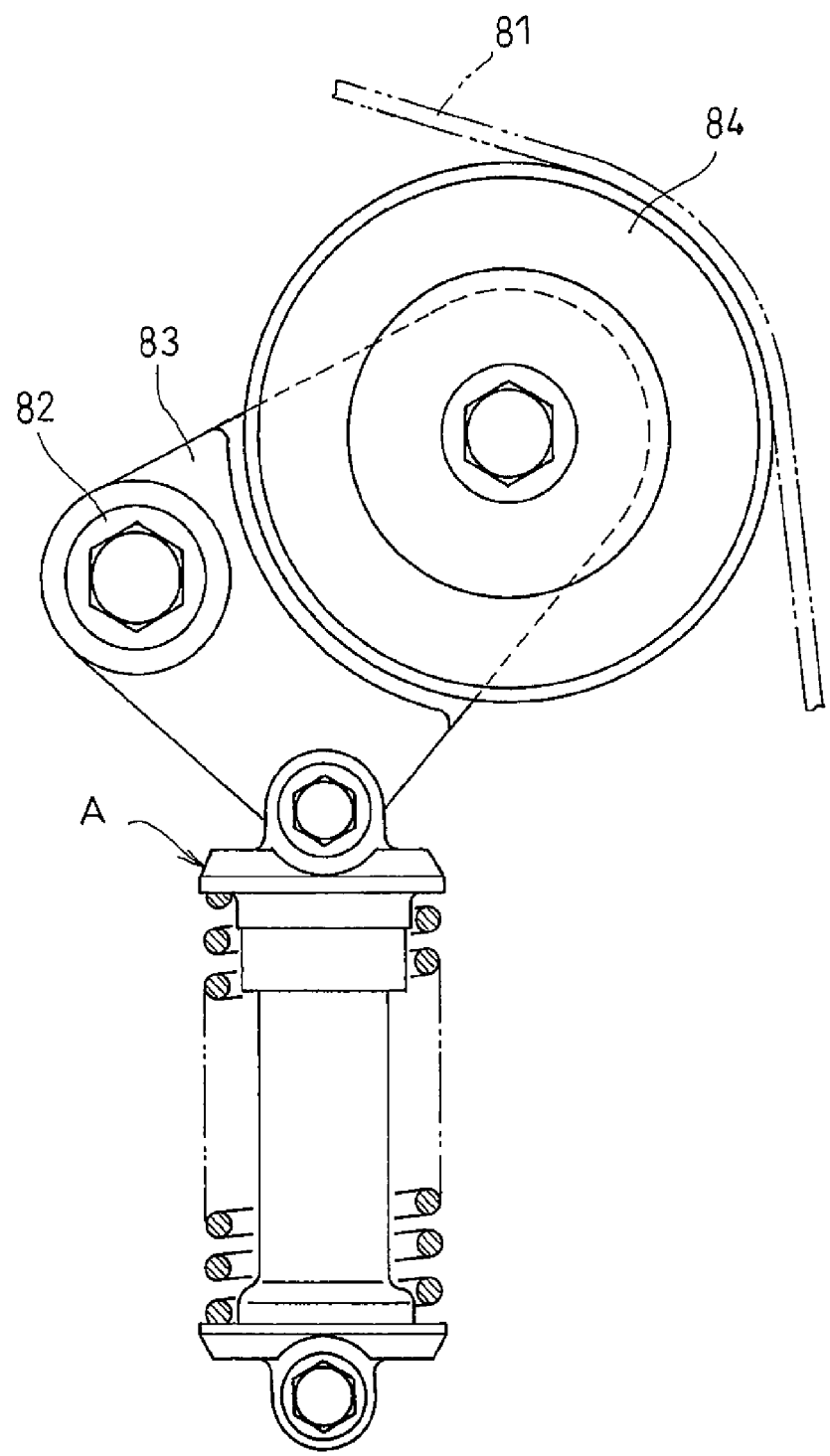
FIG. 13 is a front view of a tension adjusting device for an engine accessory driving belt.

In order to use this hydraulic auto-tensioner in the tension adjusting device for an engine accessory driving belt shown in FIG. 13, as shown in FIG. 1, the first coupling piece 12, i.e. the coupling piece mounted on the cylinder and the second coupling piece 13, mounted on the rod, are fastened to an engine block B and the pulley arm 83, respectively, by inserting bolts 35 into the bushes 18 mounted in the mounting holes 14 and 15 of the respective coupling pieces 12 and 13, and tightening the bolts 35.

In this state, if the first and second coupling pieces 12 and 13 are displaced relative to each other in the axial direction of the bolts 35 such that the hydraulic auto-tensioner A is inclined, the support ring 17 and the bush 18 in each of the couplings pieces 12 and 13 are kept in alignment with only the coupling pieces 12 and 13 pivot relative to the respective support rings 17 and bushes 18, allowing smooth inclination of the auto-tensioner. Thus, even if the auto-tensioner is inclined, the cylinder 1 and the rod 2 can be smoothly moved relative to each other in the direction in which the rod protrudes from or retracts into the cylinder. The hydraulic auto-tensioner thus operates with high accuracy.

Figure 5:
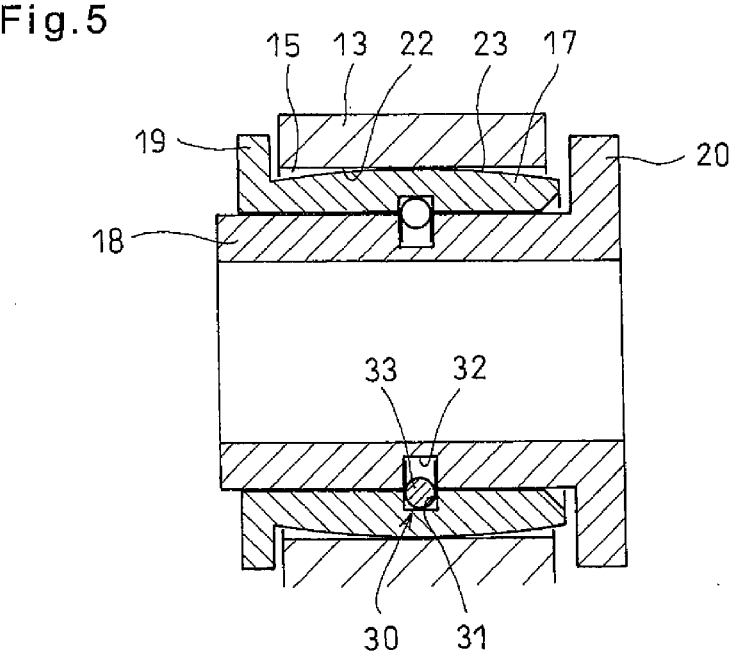
FIG. 5 is a sectional view showing a different support ring.

In FIG. 2, in order to keep the support ring 17 in alignment, the support ring 17 has the cylindrical radially outer surface 21 and the mounting hole 15 of the coupling piece 13 has the radially inner convex curved surface 16. But as shown in FIG. 5, the mounting hole 15 may have a cylindrical radially inner surface 22 and the support ring 17 may have a radially outer curved surface 23 having a convex circular arc-shaped section.

In FIG. 2, the coupling arrangement 30 includes the ring groove 31 formed in the radially inner surface of the support ring 17, the ring groove 32 formed in the radially outer surface of the bush 18, and the coupling ring 33, which can be engaged in both ring grooves 31 and 32 simultaneously. But the coupling arrangement 30 is not limited to the one shown in FIG. 2.

Figure 6:
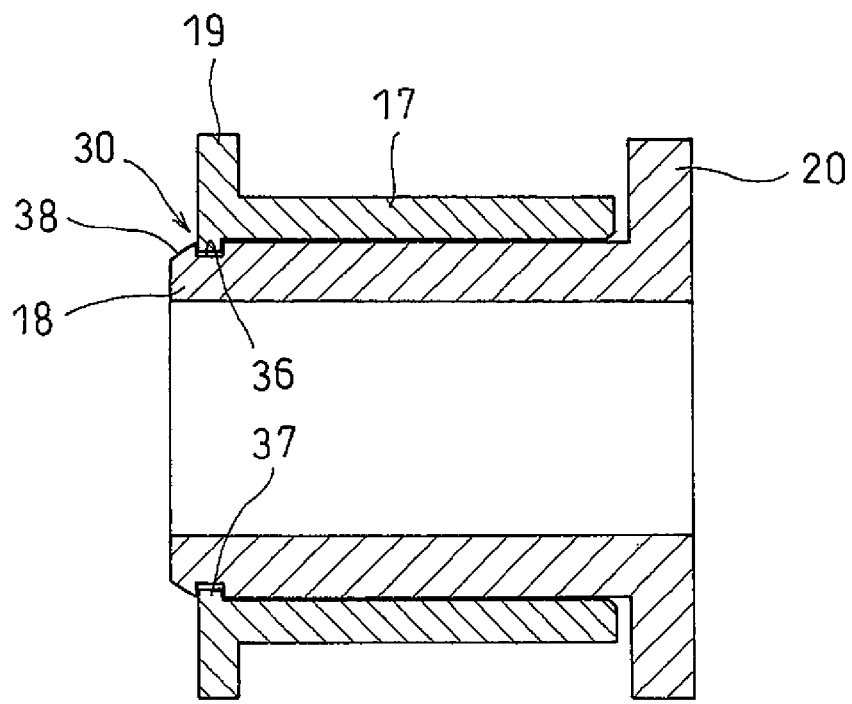
FIG. 6 is a sectional view showing a different coupling arrangement.

FIG. 6 shows a different coupling arrangement 30. The coupling arrangement shown in FIG. 6 includes an annular engaging groove 36 formed in the radially outer surface of the bush 18 at one end portion thereof, and a annular protrusion 37 formed on the radially inner surface of the support ring 17 at one end thereof and adapted to be engageable in the engaging groove 36. In order that the protrusion 37 can easily engage in the engaging groove 36, the bush 18 has a tapered guide surface 38 at the intersection between the one end surface and the radially outer surface of the bush 18.

Instead of the annular protrusion 37, a plurality of circumferentially spaced apart projections may be used.

Since vibrations from the belt 81 constantly act on the hydraulic auto-tensioner, if the spring washer 5, which is made of synthetic resin, is not coupled with a sufficiently strong force to the rod 2, which is made of metal, the coupling between the rod 2 and the spring washer 5 may loosen, which could in turn cause separation of the spring washer 5.

According to the attitude of the hydraulic auto-tensioner when mounted in position, the spring washer 5 may swivel, thus applying torque to the rod 2. This torque could cause the rod 2 to rotate relative to the spring washer 5. Such relative rotation could result in looseness of coupling between the rod 2 and the spring washer 5 and could increase such looseness until the spring washer 5 separates from the rod 2.

In the embodiment of FIGS. 7A and 7B, in order to prevent separation of the spring washer 5, the rod 2 has on its outer periphery at its top end portion inserted in the spring washer 5 an engaging arrangement 41 formed by cutting and removing the material of the rod 2 and including circumferential and axial engaging portions.

In the embodiment of FIGS. 7A and 7B, the engaging arrangement 41 includes two axially spaced apart annular grooves 42 formed by cutting in the outer periphery of the rod 2 at its upper portion as axial engaging portions, and at least one or a plurality of circumferentially spaced apart flat surfaces 44 as circumferential engaging portions formed by partially removing the material forming an annular rib 43 defined between the annular grooves 42 and having a circular arc-shaped section. Alternatively, the engaging arrangement may include more than two of the annular grooves 42, with the flat surfaces 44 formed on each of a plurality of the annular ribs 43 defined between the adjacent annular grooves 42.

By providing, by cutting, the at least two annular grooves 42 at the top end portion of the rod 2, and the flat surfaces 44 on the outer periphery of the annular rib 43 defined between the at least two annular grooves 42, and by forming the spring washer 5 from resin, the spring washer 5 engages the at least two annular grooves 42 and the at least one flat surface 44. Thus, the annular grooves 42 prevent axial separation of the spring washer 5 from the rod 2, while the flat surface 44 prevents rotation of the spring washer 5 relative to the rod 2. Thus the rod 2 and the spring washer 5 can be coupled together extremely strongly. This improves durability of the spring washer and the rod.

The engaging arrangement 41 including circumferential and axial engaging portions is not limited to the one shown in FIGS. 7A and 7B, which include the annular grooves 42 and the flat surface 44. Different engaging arrangements are shown in FIGS. 8 to 11.

Figure 8:
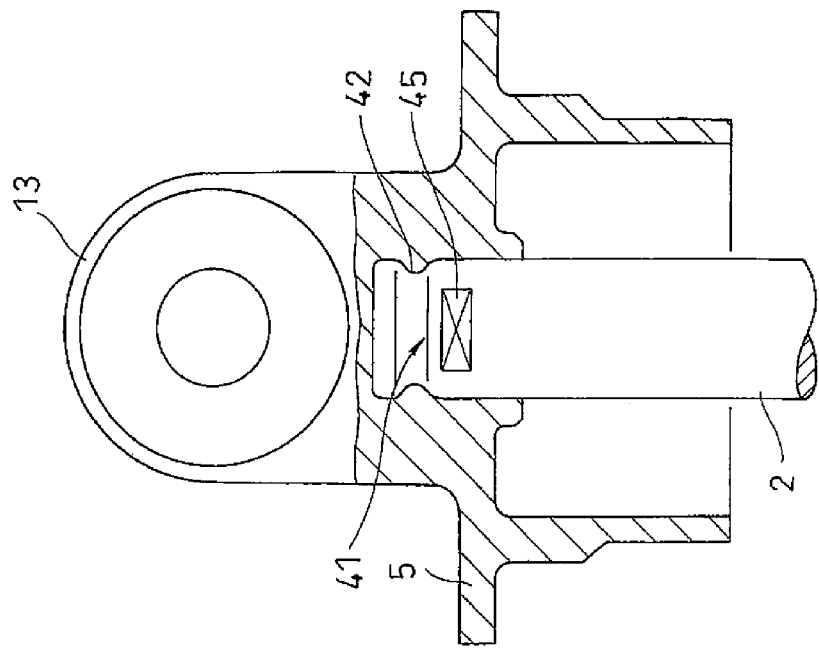
FIG. 8 is a sectional view showing a different engaging arrangement for coupling the rod and the sprig washer together.

The engaging arrangement 41 shown in FIG. 8 includes an annular groove 42, and a tangential groove 45 axially spaced apart from the annular groove 42, both grooves 42 and 45 being formed by cutting. The annular groove 42 serves as an axial engaging portion which prevents axial separation of the spring washer from the rod, while the tangential groove 45 serves as an axial/circumferential engaging portion which prevents axial separation of the spring washer from the rod and also prevents rotation of the spring washer relative to the rod.

Figure 9:
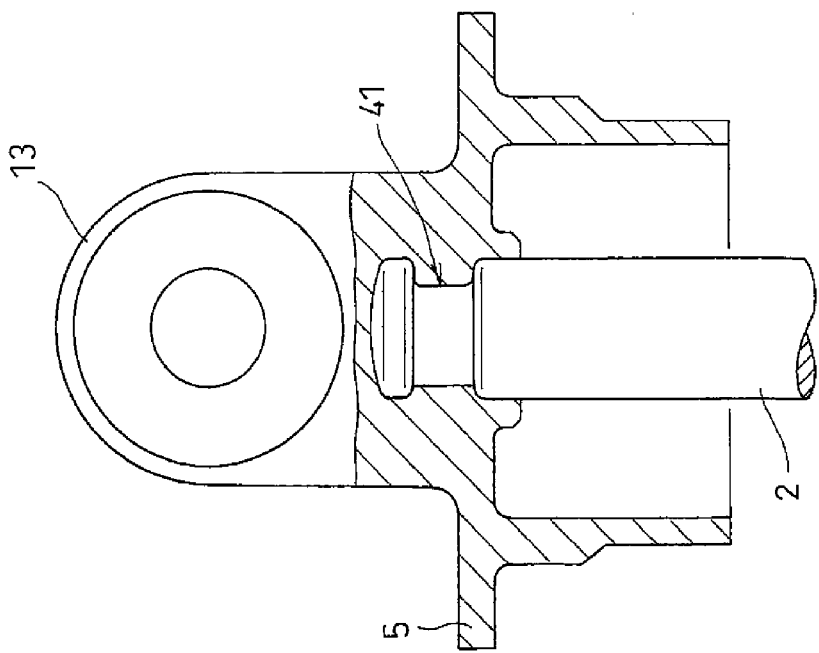
FIG. 9 is a sectional view showing a still different engaging arrangement for coupling the rod and the sprig washer together.

The engaging arrangement 41 of FIG. 9 is an eccentric groove formed by cutting. The engaging arrangement 41 of FIG. 10 is a helical groove formed by cutting.

The engaging arrangement 41 of any of FIGS. 8 to 10 does not reduce the strength of the rod 2 and can couple the rod 2 and the spring washer 5 together extremely strongly, thus improving the durability of the rod and the spring washer.

While not shown, the engaging arrangement may include at least two axially spaced apart annular grooves formed by cutting as axial engaging portions, and a helical groove formed between the adjacent annular grooves by cutting as axial/circumferential engaging portions.

Further alternatively, the engaging arrangement may be one or any number of diametric holes extending through the rod 2 at its upper portion.

Another engaging arrangement 41 is shown in FIG. 11 which is e.g. a helical groove formed in a tapered portion 46 formed at the top end portion of the rod 2. The tapered portion 46 makes it possible to increase the thickness of the spring washer at its portion surrounding the tapered portion at the top end of the rod, thus increasing the strength of the spring washer.

Figure 12:
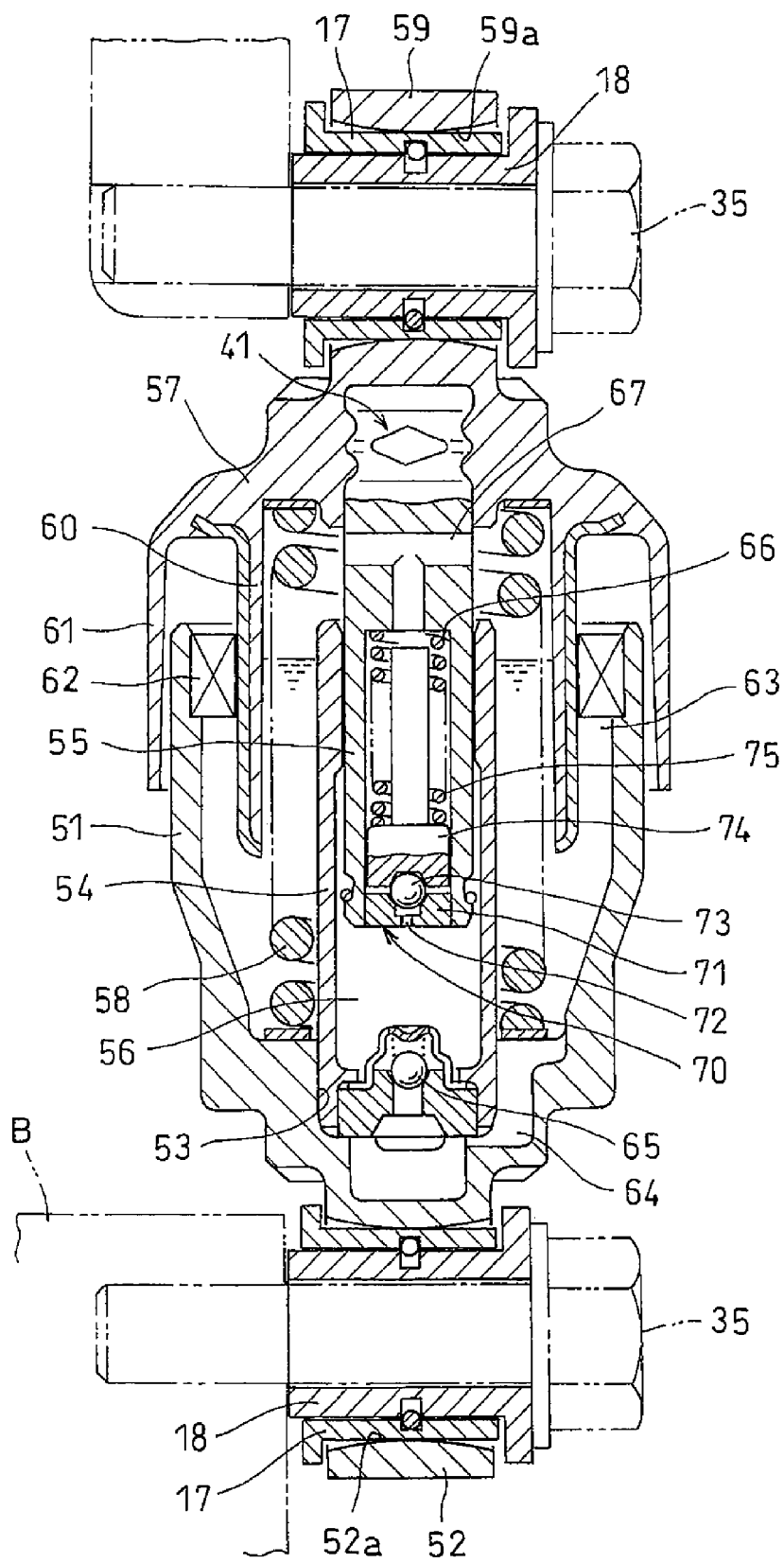
FIG. 12 is a vertical sectional view of a different hydraulic auto-tensioner embodying the present invention.

FIG. 12 shows a different hydraulic auto-tensioner according to the present invention which includes a cylinder 51 having at its outer bottom surface a first coupling piece 52 coupled to an engine block B. The cylinder 51 is formed with a sleeve fitting hole 53 in its inner bottom surface. A sleeve 54 has its bottom end portion press-fitted in the sleeve fitting hole 53. A metal rod 55 has its bottom end portion inserted in the sleeve 54 from a top end opening of the sleeve 54 so as to be slidable in the sleeve 54, defining a pressure chamber 56 in the sleeve 54. A spring washer 57 which is formed of a synthetic resin is coupled to the top end portion of the rod 55. A return spring 58 is mounted between the spring washer 57 and the inner bottom surface of the cylinder 51 to bias the cylinder 51 and the rod 55 in the direction in which the rod 55 protrudes from the cylinder 51.

A second coupling 59 is provided on the top surface of the spring washer 57 which is coupled to the pulley arm 83 shown in FIG. 13. The spring washer 57 has radially inner and outer cylindrical portions 60 and 61 extending from the bottom surface of the spring washer. A seal member 62 fitted in the top opening of the cylinder 51 has its inner periphery kept in elastic contact with the radially outer surface of the radially inner cylindrical portion 60, defining a reservoir chamber 63 between the inner periphery of the cylinder 51 and the outer periphery of the sleeve 54. The reservoir chamber 63 communicates with the pressure chamber 56, defined in the sleeve 54, through a passage 64 defined between the fitting surfaces of the sleeve fitting hole 53 and the sleeve 54. A check valve 65 is mounted in the bottom end portion of the sleeve 54 which is configured to be closed when a pushing force is applied to the rod 55 that tends to push the rod into the cylinder, thereby hydraulically dampening the pushing force with the hydraulic oil sealed in the pressure chamber 56.

The rod 55 has a valve fitting hole 66 which opens at the bottom end surface of the rod 55, and a T-shaped oil passage 67 through which the top end of the valve fitting hole 66 communicates with the reservoir chamber 63. A relief valve 70 is mounted in the valve fitting hole 66.

The relief valve 70 includes a valve seat 71 press-fitted in the bottom opening of the valve fitting hole 66, a spherical valve body 73 which selectively brings a vale hole 72 formed in the valve seat 71 into and out of communication with the valve fitting hole 66, a spring seat 74 provided on top of the valve body 73, and a valve spring 75 biasing the valve body 73 toward the valve hole 72 through the spring seat 74.

Thus, when the pressure in the pressure chamber 56 exceeds a set pressure of the relief valve 70 which is equal to the spring force of the valve spring 75, the valve body 73 moves away from the valve hole 72, opening the valve hole 72. This allows hydraulic oil in the pressure chamber 56 to flow into the reservoir chamber 63 through the oil passage 67 until the pressure in the pressure chamber 56 drops to the set pressure.

The first and second coupling pieces 52 and 59 have mounting holes 52a and 59a, respectively, which are of the same structure and shape as the mounting holes 14 and 15 shown in FIGS. 1 and 2. In each of the mounting holes 52a and 59a, the same flanged support ring 17 and flanged bush 18 as those shown in FIG. 2 are mounted and axially inseparably coupled together by the same coupling arrangement 30 as shown in FIG. 2.

The rod 55 and the spring washer 57 are coupled together by one of the engaging arrangements shown in FIGS. 7A to 11.

What is claimed is:

1. A hydraulic auto-tensioner comprising a cylinder containing hydraulic oil, a rod inserted in the cylinder, a return spring biasing the rod and the cylinder in a direction in which the rod protrudes from the cylinder, a hydraulic damper mechanism mounted in the cylinder and configured to dampen a pushing force that tends to axially push the rod into the cylinder against the force of the return spring, and first and second coupling piece assemblies, wherein the first coupling piece assembly includes a coupling piece mounted to a closed bottom end of the cylinder and the second coupling piece assembly includes a coupling piece mounted on a top end portion of the rod which protrudes from the cylinder, each of the coupling pieces being formed with a mounting hole and having first and second axial end surfaces, wherein each of the first and second coupling piece assemblies further comprises a support ring inserted in the mounting hole, and a bush inserted in the support ring, wherein one and the other of a radially outer surface of the support ring and a radially inner surface of the mounting hole are a curved surface and cylindrical surface, respectively, whereby the support ring is alignable, wherein the support ring has a first radially outwardly extending flange at a first end portion of the support ring and the bush has a second radially outwardly extending flange at a second end portion of the bush which is axially opposite to the first end of the support ring such that first and second axial gaps are defined between the first radially outwardly extending flange and the first axial end surface of the coupling piece and between the second radially extending flange and the second axial end surface of the coupling piece, respectively, and wherein each of the first and second coupling piece assemblies further includes a coupling arrangement configured to engage both the support ring and the bush when the bush is inserted into the support ring, thereby preventing axial separation of the support ring and the bush from each other.

2. The hydraulic auto-tensioner of claim 1, wherein the bush is formed of aluminum and the support ring is formed of a synthetic resin.

3. The hydraulic auto-tensioner of claim 2, wherein the synthetic resin is a polyamide or a polyimide reinforced with glass fibers or carbon fibers.

4. The hydraulic auto-tensioner of claim 1, wherein the coupling arrangement comprises a pair of ring grooves formed in a radially inner surface of the support ring and a radially outer surface of the bush, respectively, so as to be radially aligned with each other, and a coupling ring which is radially deformable so as to engage both of the pair of ring grooves.

5. The hydraulic auto-tensioner of claim 4, wherein the coupling ring comprises a snap ring having circumferentially opposed separate ends, and wherein one of the pair of ring grooves has a depth equal to or larger than a diameter of a wire forming the snap ring.

6. The hydraulic auto-tensioner of claim 4, wherein the coupling ring is an O-ring made of rubber.

7. The hydraulic auto-tensioner of claim 1, wherein the coupling arrangement comprising an annular engaging groove formed in first end portion of the radially outer surface of the bush, and a protrusion formed on the first end portion of the radially inner end surface of the support ring and engaged in the annular engaging groove, and wherein the bush has a tapered guide surface at an intersection between the first end surface and the radially outer surface.

8. The hydraulic auto-tensioner of claim 1, further comprising a spring washer formed by molding a resin for receiving a spring force of the return spring, wherein the coupling piece mounted on the top end of the rod is integral with the spring washer, wherein the top end portion of the rod is inserted in the spring washer and has an engaging arrangement formed by cutting and removing a material forming an outer periphery of the top end portion of the rod and including circumferential and axial engaging portions.

9. The hydraulic auto-tensioner of claim 8, wherein the engaging arrangement comprises at least two axially spaced apart annular grooves formed by cutting, and at least one flat surface formed by cutting and removing a material forming at least a portion of an outer periphery of an annular rib defined between the annular grooves.

10. The hydraulic auto-tensioner of claim 8, wherein the engaging arrangement comprises an annular groove formed by cutting, and a tangential groove formed by cutting so as to be axially spaced apart from the annular groove.

11. The hydraulic auto-tensioner of claim 8, wherein the engaging arrangement comprises an eccentric groove formed by cutting.

12. The hydraulic auto-tensioner of claim 8, wherein the engaging arrangement comprises a helical groove formed by cutting.

13. The hydraulic auto-tensioner of claim 8, wherein the top end portion of the rod is tapered toward a top end surface of the rod.

\* \* \* \* \*